Patented Dec. 11, 1934

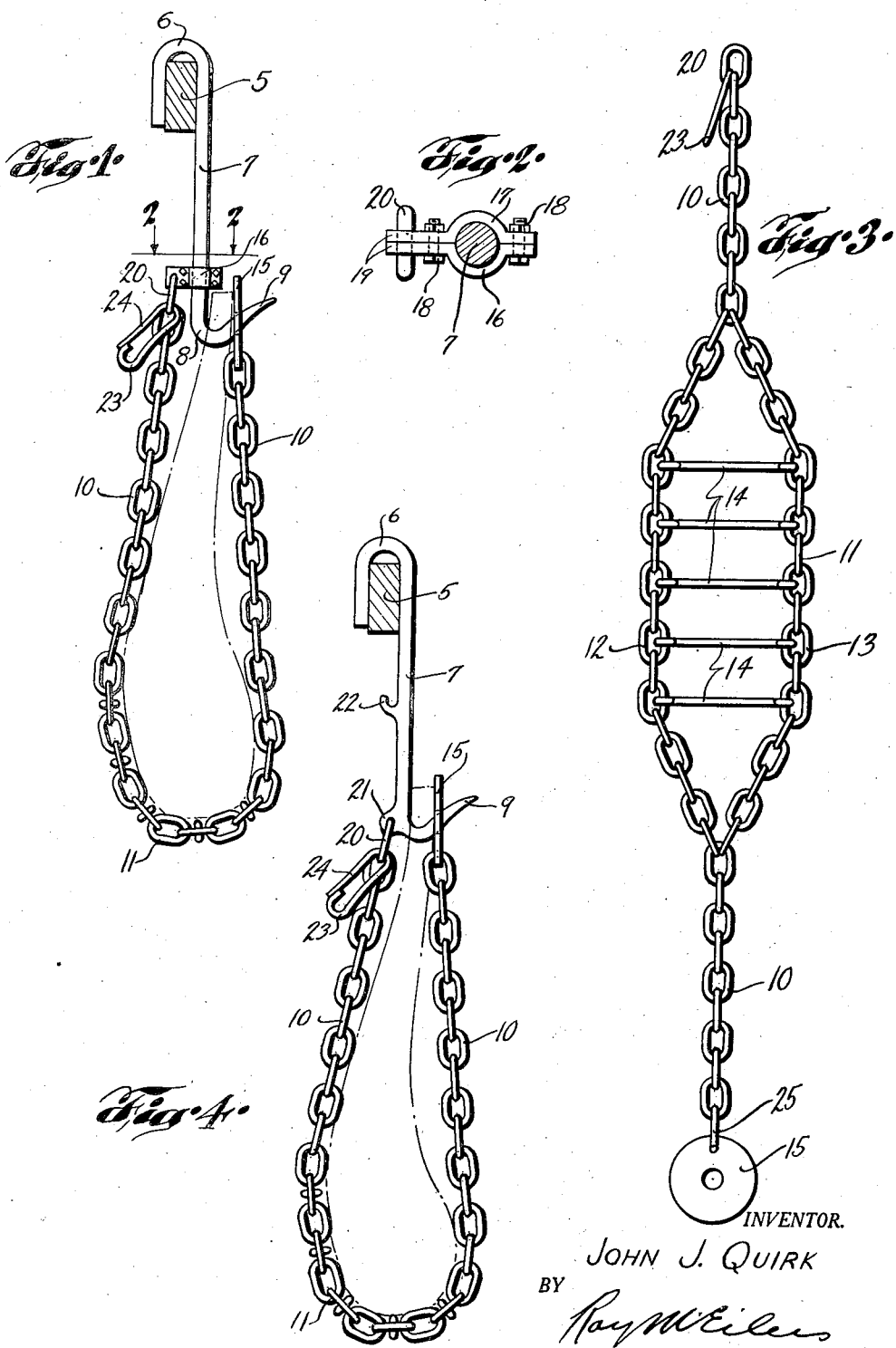

1,983,706

UNITED STATES PATENT OFFICE 1,983,706

MEAT HOOK

John J. Quirk, Jersey City, N. J.

Application January 2, 1932, Serial No. 584,351

9 Claims. (Cl. 17—44)

This invention relates to improvements in meat hanging devices, and more particularly to improved arrangements either embodying, or adapted for attachment to, meat hooks of a type usually employed in refrigerator cars and other carriers for transporting quarters of beef. The invention is presently described by reference to a device for supporting forequarters of beef.

Heretofore considerable difficulty has been experienced in transporting quarters of meat in refrigerating cars; according to prevailing practice the side or quarter of beef being hooked over a sharpened, substantially C-shaped meat hook, by extending such hook between the ribs of the beef quarter. By reason of the great variety of car movements, due to vibration, road bed irregularities, etc., there is a tendency particularly for the forequarters to pull through around the hooked portion thereof, thus falling to the floor of the car and becoming damaged in transit.

The present invention has as a primary object, an elimination of the difficulties above noted, by providing an extended flexible supporting member for the purpose of augmenting the usual suspension support with a subjacent support, so that the supporting device engages both the lower and the upper parts of a quarter of beef in transit.

An additional object of the invention is attained in a device in the nature of an articulated or flexible element, which serves materially to enhance the usual area of supporting engagement with respect to sides or cuts of meat in transit, whereby to prevent tearing and damage thereto.

More particularly stated, another object of the invention is attained in a meat sling, embodying a hammock portion which is adapted for ready detachable engagement with the usual or standard meat hook now used in great numbers, for supporting quarters of meat, in suspended relation, in refrigerator cars.

Yet another object of the invention is attained in the provision of a meat hook and sling so constructed as to be susceptible of ready adjustment and adaptability to quarters of meat of different sizes.

The foreging and additional objects will more fully appear from the following detailed description of certain preferred embodiments of my device, and from the accompanying drawing, in which:

Fig. 1 is a side elevation of a preferred form of a device of this invention and showing the manner of its use, a forequarter of beef being shown diagrammatically as positioned when the device is in use; Fig. 2 is a horizontal sectional elevation of a clamp preferably utilized in connection with the meat sling, as viewed from line 2—2 of Fig. 1; Fig. 3 is a plan view of the sling appearing in Fig. 1, and Fig. 4 is a side elevation similar to Fig. 1, except showing a modified arrangement of the device in which the sling portion is, or may be, permanently secured to the meat hook.

Referring now by characters of reference to the drawing, there is shown in section, at 5, the usual meat rail which, as is understood, is disposed along each side of, and within a refrigerator car. It will be understood, of course, that this same rail or its equivalent may be also employed in packing houses, in a variety of meat refrigerating enclosures, and in connection with marine transportation, as well as rail transportation, of meat and like products. The upper or outer terminal of the hook consists of an inverted U-shaped portion 6, the opposite legs of which serve closely and laterally to engage the opposite faces of the meat rail, and thus oppose any turning movement of the hook, as it is loaded. The innermost leg of the U-shaped portion is continued downwardly into a shank 7 of the hook which, near its inner or lower terminal, is bent outwardly as at 8 and terminates in a comparatively sharp terminal portion 9. As thus far described the meat hook member is, or may be, of conventional construction.

The sling of the present embodiment of the invention is preferably constructed of chain by reason of its durability and flexibility, as well as the ease of adjustment provided through the chain links. It will be understood that other equivalent flexible, metallic or non-metallic materials may be employed in the construction of the sling. As presently disclosed it is seen that the sling embodies opposite end portions 10, each consisting of single lengths of chain which may, as desired, be of dissimilar lengths. Intermediate the sling and serving to connect the single lengths 10, is a hammock portion, indicated generally at 11, and consisting of paired longitudinal chains 12 and 13, arranged in parallel relation, the end links of each of which are brought into connection with the innermost links of each of the opposite end portions 10. Through the central portion of the hammock 11 are provided a plurality of parallel, transverse, relatively rigid spacer members 14, each of the spacers being connected jointedly at its opposite ends with corresponding links of the portions 12 and 13, and thus tending, under all circumstances, to keep the portions 12 and 13 spread in definitely spaced relation. As will appear, there is thus provided a substantial number of definitely spaced supporting elements, at the area of engagement between the sling and the lower surface portions of the quarter of beef supported thereby. In order to prevent any harmful abrasion or cutting by the outermost link of the chain sling, such link consists, by preference, of a centrally apertured plate 15 which may conveniently consist of a washer, the central aperture being of such size as to be readily insertable over the portion 9 so as flatly to engage the adjacent portions of the meat carried by the portion 8 of the hook.

As a means for securing the sling to the meat hook, there is preferably provided a bolt-type clamp, best shown in Fig. 2, and consisting of mating clamp halves 16 and 17, brought into frictional engagement with the shank portions 7 of the hook, as by bolts 18. Extended rearwardly of the clamp is an apertured arm portion 19, serving to receive the link 20 at the innermost end of the sling.

In Fig. 4 is shown a modified arrangement, differing essentially from that shown in Fig. 1, only in that the shank portion of the meat hook is provided with an integral rearward extension 21 apertured to receive the link 20, and is also provided further up on the shank, with an integral hook portion 22, which serves conveniently to receive any of the intermediate links of the sling or the hammock structure, when the sling is not in use. The structures of Figs. 1 and 4 need not differ essentially either in the manner of their use, in the type of sling employed therewith, or in their ranges of possible adjustment. The structure of Fig. 1 is, however, preferable in enabling the sling to be employed with a standard hook, and as not requiring a specially formed hook, such as appears in Fig. 4.

It will appear from the drawing that, as various sizes of beef sides or quarters may be encountered, facilities for full adjustment of the sling and hammock are provided, first, in a snap 23 in the nature of a hook element provided with a resilient closure 24, the snap 23 adapted to be brought into service as one link of the chain, at or near one end of the sling. There also may be provided, for example as a substitute or in addition to the end link 25, nearest the washer 15, a snap link (not shown) which may be, and is by preference, identical in construction with the snap link 23.

While the manner and advantages of use of the hook and sling structure described in detail, are thought to be fully apparent, it may be noted that any desirable adjustment in the effectively utilized length of sling or hammock, may be attained by engaging the snap hook 23, with any desired link in the adjacent single chain portion 10, so that the bight length of the sling can be modified instantly. It will also appear as desirable to maintain the hammock portion of the chain, in such a position with respect to the quarter of beef, that the major part of the load is borne by the spreaders 14 and adjacent parts of the chain sections 11 and 12 of the hammock, so as to provide the maximum area of subjacent support for the beef, to the end of preventing any undue abrasion thereof. It will appear that through the provision of a second snap link below the plate or washer 15, the hammock may be brought into any desired subjacent relation to the side or quarter of beef. In addition to the foregoing facilities for full adjustment, in the event the device is desired to be used for some other kindred purpose, an additional adjustment between the sling and meat hook, may be attained through vertical adjustment of the clamp 17, along the shank portion 7, of the hook in the example appearing in Fig. 1.

It will appear from the foregoing description that the structure described serves positively to obviate the shearing and tearing tendencies incident to the older practice of suspending quarters of beef solely by extending the hook portion through the flesh portions thereof. The present device has been found fully to obviate the difficulties referred to, and positively to prevent a certain damage to meat in transit, which damage has heretofore been regarded as unavoidable, and in all other respects fully to attain the several objects heretofore set forth.

While I have described the invention by making specific and detailed reference only to a few of the possible embodiments thereof, such description is to be understood solely by way of example, and not in a limiting sense, since obviously a number of changes may be made in the parts, their arrangement and combinations, without departing from the full intended spirit and scope of the invention.

I claim:

1. In a device for supporting quarters of beef in transit, a meat hook member having an inverted U-shaped upper portion adapted to engage a hook rail, an elongate vertical shank portion and a hook at its lower end; a sling formed of chain, and consisting of single lengths at the ends of the sling, an intermediate hammock portion formed of parallel lengths of chain, rigid spreader or spacer elements forming the transverse portions of the hammock and having jointed and flexible connection with said parallel lengths, means presented rearwardly of the shank portion of the hook, for anchoring one end of the sling thereto, a washer at the opposite end of the sling adapted to be inserted over the open end of the hook, and a snap link carried by the sling near at least one of its ends, and adapted to permit adjustment of the effectively utilized length of sling, to compensate for differences in size of beef quarters supported by the sling and hook.

2. A device for supporting quarters of meat while in transit, said device including a rigid hook on which a quarter of meat is adapted to be suspended, an auxiliary sling member having a widened portion between its ends, and having one end detachably and adjustably engaged by the hook, and the opposite end adapted to be permanently attached to the hook, whereby the sling substantially surrounds the meat quarter and is arranged to be drawn up against the meat to provide subjacent support therefor.

3. In a device for supporting quarters of meat in transit, a meat hook, a chain sling supported from the hook and including a hammock portion of substantial area disposed between the ends of the sling, and flexible means on the ends of the sling for adjusting the sling to bring said hammock portion into any desired supporting position beneath the quarter of meat suspended from the hook, and means comprising a portion of the meat hook for engaging the sling-adjusting means when the sling is drawn up, to lock the sling in its adjusted position.

4. A meat-hanging device including a hook, a chain sling having a widened bight portion, the flexible chain ends of the sling being separately carried by the hook, and said flexible ends serving as means for adjusting the position of the bight portion beneath the supported meat, to maintain such bight portion intermediate the opposite points of supporting connection between the sling and the hook, all arranged so that the bight portion is initially suspended out of contact with the meat hung on the main hook, but also so as to permit the bight portion of the sling to be drawn up into supporting contact with the meat hung on the hook and at a lower point, one of the chain ends being locked with the hook after the sling is adjusted.

5. In a meat hook, the combination of a rigid hook having a meat engaging and supporting portion, an auxiliary meat engaging and supporting element, flexible means supporting the auxiliary meat supporting element, said flexible means being arranged to draw the auxiliary supporting element up against the meat to support the same at a lower point, and said meat engaging portion of the hook engaging the flexible element when drawn up to lock the auxiliary supporting element in adjusted position.

6. In a meat hook, the combination of a main hook having a meat engaging prong, an auxiliary meat engaging and supporting element arranged approximately under the main hook prong to normally extend approximately under the meat, a flexible device carrying said auxiliary element and initially suspending said element out of contact with the meat hung on the main hook prong, and said flexible device being arranged to draw the auxiliary supporting element up into supporting contact with the meat hung on the prong and at a lower point, said main hook having a carrying portion constructed to interlock with the flexible device, the flexible device being movable lengthwise relative to the carrying portion and being adapted to draw up the auxiliary supporting element and interlock the flexible device with the carrying portion of the main hook to hold the auxiliary element in supporting position.

7. In a device for supporting quarters of beef in transit, a meat hook member having an inverted U-shaped upper portion adapted to engage a hook rail, an elongated vertical shank portion and a hook at its lower end, a sling portion and a hook at its lower end, and consisting of single lengths formed of chain, and consisting of single lengths at the ends of the sling, an intermediate hammock portion formed of parallel lengths of chain, rigid spreader or spacer elements forming the transverse portions of the hammock and having jointed and flexible connection with said parallel lengths, means on the rear of the shank portion of the hook, for anchoring one end of the sling thereto, and means at the opposite end of the sling adapted to be inserted over the open end of the hook.

8. In a meat hook, the combination of a main hook having a meat engaging prong, an auxiliary meat engaging and supporting element arranged approximately under the main hook prong to normally extend approximately under the meat, a flexible device carrying said auxiliary element and initially suspending said element out of contact with the meat hung on the main hook prong, and said flexible device being arranged to draw the auxiliary supporting element up into supporting contact with the meat hung on the prong and at a lower point, said main hook having a carrying portion constructed to interlock with the flexible device, the flexible device being movable lengthwise relative to the carrying portion and having an end portion arranged to form a hand hold for drawing up the auxiliary supporting element and interlocking the flexible device with the carrying portion of the main hook to hold the auxiliary element in supporting position.

9. In a device for supporting quarters of meat in transit, a meat hook having a meat engaging and supporting portion, an auxiliary meat supporting element, flexible end members for said element, one of which is adapted to be permanently attached to the meat hook, and the other of which is adapted to be engaged with the meat supporting portion of the hook after the auxiliary element has been adjusted under the meat, all arranged so that one flexible end member initially suspends the auxiliary element out of contact with the meat hung on the main supporting hook, while the other flexible end is arranged to draw the auxiliary supporting element up into supporting contact with the meat hung on the support and at a lower point, said latter flexible end member being locked with the meat hook after the auxiliary support is so adjusted and drawn up.

JOHN J. QUIRK.